United States Patent [19]

Strehl

[11] Patent Number: 4,807,032
[45] Date of Patent: Feb. 21, 1989

[54] METHOD OF CORRECTING IMAGE ERRORS

[75] Inventor: Herbert Strehl, Munich, Fed. Rep. of Germany

[73] Assignee: Siemens Aktiengesellschaft, Berlin and Munich, Fed. Rep. of Germany

[21] Appl. No.: 218,468

[22] Filed: Jul. 12, 1988

Related U.S. Application Data

[63] Continuation of Ser. No. 820,788, Jan. 22, 1986, abandoned.

[30] Foreign Application Priority Data

Jan. 24, 1985 [DE] Fed. Rep. of Germany ....... 3502315

[51] Int. Cl.⁴ .......................... H04N 5/14; H04N 5/21
[52] U.S. Cl. ...................................... 358/166; 358/13; 358/167
[58] Field of Search ............... 358/160, 166, 106, 167, 358/105, 57, 37, 36, 21 R, 13, 284; 382/57

[56] References Cited

U.S. PATENT DOCUMENTS

| | | | |
|---|---|---|---|
| 3,825,680 | 7/1974 | Verhoeven | 358/167 |
| 4,403,250 | 9/1983 | Kellar | 358/105 |
| 4,626,891 | 12/1986 | Achiha | 358/21 R |
| 4,651,211 | 3/1987 | Weckenbrock | 358/166 |

OTHER PUBLICATIONS

"Digitale Magnetbandaufzeichnung von Video-und Audiosignalen auf einem Videocassetten-recorder," Westerkamp, 10 Jahrestagung der FKTG, Sep. 1982, pp. 326-348.

Primary Examiner—Tommy P. Chin

[57] ABSTRACT

A method of correcting image errors in the transmission of difference pulse code modulated (DPCM) coded image signals, in which image signal values of only a small number of image lines are intermediately stored at the receiving end, provides an error trail recognition and the replacement of the adulterated image signal values by correction values.

13 Claims, 2 Drawing Sheets

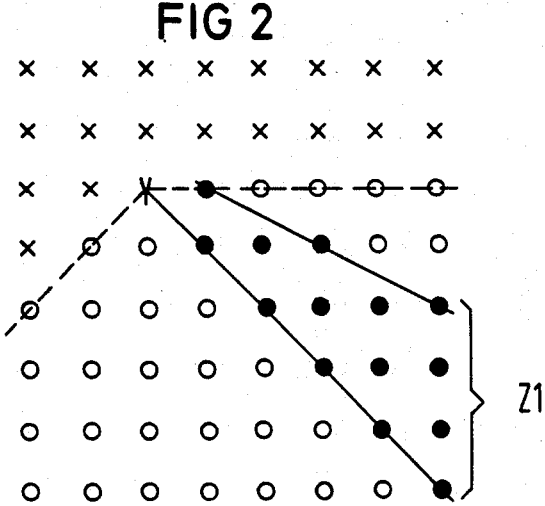

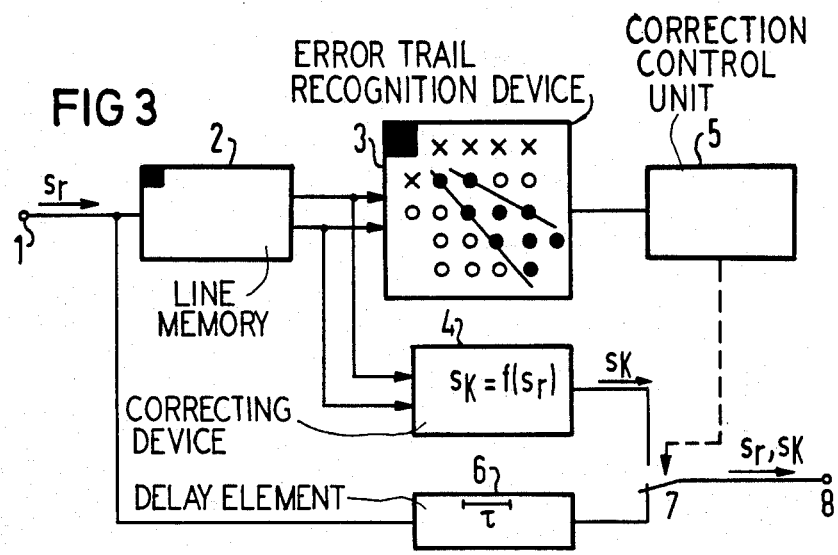
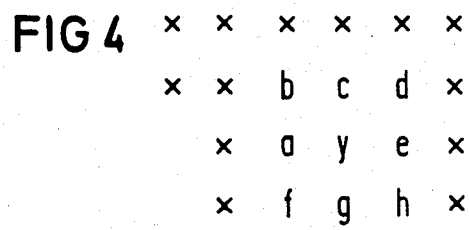
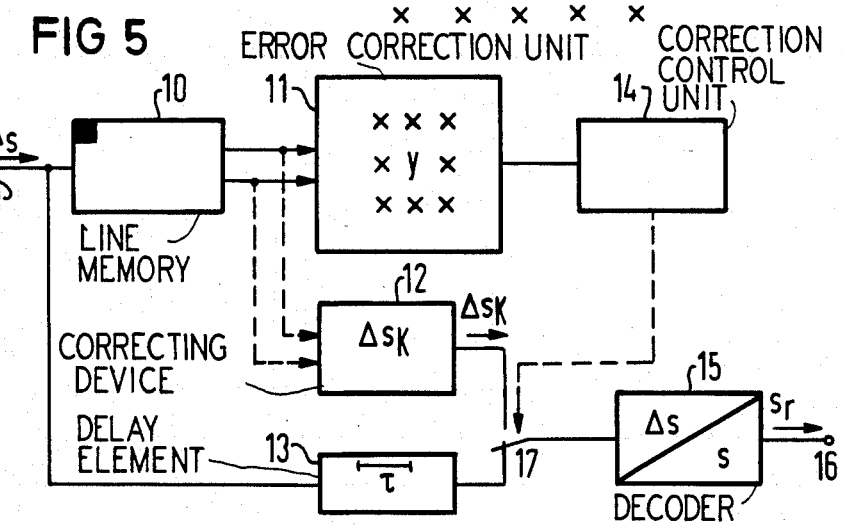

METHOD OF CORRECTING IMAGE ERRORS

This is a continuation of application Ser. No. 820,788, filed Jan. 22, 1986, abandoned.

CROSS REFERENCE TO RELATED APPLICATION

This application is related to application Ser. No. 820,783 filed 1/22/86.

BACKGROUND OF THE INVENTION

1. Field of the Invention

The present invention relates to a method of correcting image errors in the transmission of difference pulse code modulated (DPCM) coded image signals.

2. Description of the Prior Art

In the transmission of image signals, two fundamental methods are known for correcting image errors, the origin of which consists of disturbances on the transmission link. In the case of the first method, error-correcting codes are used to reduce the transmission errors. In order to be effective, however, these require a component of more than 5% of the overall transmission capacity. In the case of the second method, so-called image error masking is used. For this purpose, it is merely necessary to recognize a transmission error and to replace the faulty image signal values (PCM or DPCM coded scan values) by correction values which have been obtained from a preceding television image or have been obtained by interpolation from the surrounding image signal values. If the correction values are obtained from a preceding television image/television half image, an image memory/half image memory is required at the receiving end. When moving images are to be transmitted, these correction values can themselves result in errors.

If image signals are transmitted by way of difference pulse code modulation (DPCM) coded signals, an error in one single DPCM value will be sufficient to produce a so-called error trail which results in a considerably greater disturbance in the television image than one single, faulty image signal value such as occurs in transmission of pulse code modulated (PCM) signals.

SUMMARY OF THE INVENTION

The object of the present invention, therefore, is to provide a redundancy-free method of correcting image errors, the storage requirement of which is low.

The above object is achieved, according to the present invention, in a method of correcting image errors in the transmission of DPCM coded image signals which is particularly characterized in that only the image signal values of a small number of television lines are intermediately stored at the receiving end, that the recognition of an error trail takes place by analyzing the image structure of a television image/television half image, and that adulterated image signal values are replaced by correction values. More specifically, the method is characterized in that, for the error trail recognition, a constant comparison takes place of the reconstructed PCM image signal values within and outside of the geometric structure of the error trail.

The present invention is based on the recognition that in the event of a transmission error, the resultant error trail has a specific geometric structure in dependence upon the prediction algorithm and the magnitude of the follow up errors of the individual PCM signal values is also governed by the prediction algorithm. Therefore, the typical error structure can easily be recognized. The corresponding methods are known in the context of character recognition. Naturally, it is particularly simple to recognize and correct an error trail in image components which have no special structure. In strongly patterned image components, these error trails are more difficult to recognize, but also result in significantly less interference and therefore need not be corrected in such image components. In order to recognize an error trail, it is merely necessary to intermediately store a small number of image lines (television lines).

The recognition and correction of the error trails can naturally also take place prior to the reconversion into PCM signal values, which is equivalent to an integration method described by the prediction algorithm, in which case it is only necessary to recognize and correct one faulty DPCM signal value.

BRIEF DESCRIPTION OF THE DRAWINGS

Other objects, features and advantages of the invention, its organization, construction and operation will be best understood from the following detailed description, taken in conjunction with the accompanying drawings, on which:

FIG. 1 symbolically illustrates a portion of a television image;

FIG. 2 symbolically illustrates and shows the fundamental structure of an error trail;

FIG. 3 is a basic schematic representation of a correcting device;

FIG. 4 symbolically illustrates a portion of a DPCM coded television image; and

FIG. 5 schematically illustrates a correcting device for DPCM signal values.

DESCRIPTION OF THE PREFERRED EMBODIMENTS

Referring to FIG. 1, a portion of the television image is represented. The individual crosses x and letters each correspond to a PCM image signal value (digitized scan value). In the coding, in a manner known per se, from the signal values which surround a current PCM image signal value X, here A, B, C and D, a prediction value $x = a \times A + b \times B + c \times C + d \times D$ is calculated and is compared with the current image signal value X. The difference is then transmitted as a DPCM signal value $\Delta s$. At the receiving end, in a similar procedure, the PCM signal values are regained from the already reconstructed signal values $A_r$, $B_r$, $C_r$, $D_r$ and the corresponding DPCM signal value $\Delta s$.

As illustrated in FIG. 2, in the event of the adulteration of one or more of the higher-value bits of a DPCM signal value $\Delta s$, an error trail occurs, the boundaries of which, on the basis of the above prediction algorithm, considered from the adulterated signal value Y, extend horizontally towards the end of the line and approximately diagonally towards the lower left. A clearly visible core Z1 with heavily-adulterated PCM image signal values (scan values or image points) here extends from the first adulterated image signal value Y approximately diagonally towards the lower right. The intensity of the adulterations generally decreases rapidly in accordance with the distance from the first adulterated image signal value Y. If the prediction is based on only positive factors a, b, c and d, then the errors of the image signal values also relate to the same direction, i.e.

all the image points affected by the adulteration become, for example, uniformly brighter or darker.

The correcting device illustrated in FIG. 3 is supplied via an input 1 with the reconstructed image signal values $s_r$ (PCM values) emanating from a DPCM decoder. The input 1 is connected to the input of a line memory 2, whose storage capacity represents only a few image lines (television lines). The outputs of the line memory 2 are connected to an error trail recognition device 3 whose output is connected to the input of a correction control unit 5. The outputs of the line memory 2 are also connected to a correcting device 4 whose output is connected to the first input of a transfer switch 7 whose other input is connected by way of a delay element 6 to the input 1 of the correcting device. The transfer switch 7, whose output is referenced 8, is actuated by the correction control unit 5.

The reconstructed PCM image signal values $s_r$ emanating from the DPCM decoder are input into a line memory 2. The storage capacity of the line memory need only amount to a few image lines (approximately 5 image lines). The error trail recognition device basically compares the PCM image signal values within an image trail both with one another ad with the image signal values outside of the image trail. If the image surface is uniform and unstructured, these comparisons will indicate the errors which occur on the basis of the prediction algorithm which is being used. If an error trail is recognized, the correction control unit 5 actuates the transfer switch 7 and correction values $s_K$ calculated by the correcting device 4 are output in place of the PCM image signal value $s_r$ which have been delayed by way of the delay element 6. The correcting device can naturally differ considerably in this construction. For example, it is conceivable to replace the adulterated image signal values of an error trail by the last unadulterated image signal value (before the adulterated image signal values Y). Correction can also take place in a calculating loop which is similar to the DPCM decoder and into which a calculated correction value assigned to the adulterated signal value Y and the following adulterated PCM image signal values from the line memory 2 are input for correction purposed. The delay time of the delay element 6 is designed to be such that the PCM image signal values and correction values which correspond to one another occur at the inputs of the transfer switch 7.

In FIG. 4, DPCM signal values y,a, b, c . . . assigned to the image signal values X, A, B, C . . . have been represented in accordance with the portion of the television image. On the basis of a DPCM signal value $\Delta s = y$ and the reconstructed image signal values $A_r$, $B_r$, $C_r$, $D_r$ the current PCM image signal value X is reconstructed, etc. If uniform image components are transmitted, all the DPCM signal values s are equal to or approximately equal to zero. An adulterated DPCM signal value differ substantially from the image signal values by which it is surrounded. In this case, it is highly probable than an error exists on the transmission path. Correction is equally simple. An adulterated DPCM signal value y is replaced by the value zero. This method can also be used in a modified form in the case of somewhat more complicated image structures, for example for areas in which a uniform change in brightness occurs. The adulterated DPCM signal value y is then replaced by an interpolation value which is calculated from the DPCM signal values by which it is surrounded, or from already reconstructed PCM image signal values.

A correcting device which operates at the DPCM level is illustrated in FIG. 5. The DPCM input 9 thereof is connected to the input of a DPCM line memory 10 and to the input of a delay element 13. The outputs of the DPCM line memory 10 are connected to the inputs of an error correction unit 11 whose output is connected to a DPCM correction control unit 14. The outputs of the DPCM line memory 10 are also connected to the inputs of a DPCM correcting device 12 whose output is connected to the first input of a transfer switch 17 which has a second input connected to the output of the delay element 13. The transfer switch 17 is actuated by the DPCM correction control unit 14. The output of the transfer switch 17 is connected to a DPCM decoder 15 which produces the reconstructed image signal value $s_r$ at its output 16.

The correcting device illustrated in FIG. 5 for DPCM values $\Delta s$ corresponds in its fundamental construction to the correcting device for PCM signal values. However, the correcting device for DPCM signal values is connected at its output to the DPCM decoder. The DPCM signal values $\Delta s$ for a plurality of consecutive image lines are again input into the DPCM line memory 10. The DPCM error recognition unit 11 merely checks whether, in a uniform image component, one single DPCM signal value x differs from the DPCM signal values by which it is surrounded and which all have the value zero or a very small value. In this case, via the DPCM correction control unit 14, the transfer switch 17 is switched from the illustrated rest position to the output of the DPCM correcting device 12 at whose output the DPCM correction value $\Delta s_K$ occurs. Under the most simple circumstances, the value zero can be used as a DPCM correction value $\Delta s_K$, but is also possible, as mentioned above, to obtain the DPCM correction value by interpolation from the adjoining DPCM signal values. For example, $\Delta s_K = \frac{1}{2}a + \frac{1}{4}b + \frac{1}{4}/4c$, where a is the DPM signal value prior to the adulterated DPCM signal value y, c is directly above y and b occurs before c. The DPCM decoder 15 converts the DPCM signal values $\Delta s$, $\Delta s_K$ in a known manner into reconstructed PCM image signal values $s_r$ which are emitted from its output 16.

The DPCM correcting device illustrated in FIG. 5 can also be used to process coded DPCM signal values for each original DPCM signal value is assigned a specific binary combination by a transmitting-end coder. However, this must be taken into account the DPCM error recognition. If the DPCM signal values are quantized with different quantization curves, the DPCM input 9 must be preceded by an appropriate decoding device.

Disregarding circuit expense, it is immaterial whether PCM image signals or DPCM signal values are corrected since the DPCM signal values represent, as it were, a derivation of the PCM image signal values. Actually, it is also possible to carry out error recognition by checking the DPCM signal values and to correct the adulterated PCM image signal value.

Although I have described my invention by reference to particular illustrative embodiments thereof, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:

1. A method of correcting image errors in a transmission system in which pulse code modulated image signals are transformed at a transmitting side into difference pulse code modulated image signal values which are transmitted to receiving side, and at the receiving side regained pulse code modulated image signal values, corresponding to said pulse code modulated image signal values, are reconstructed from said difference pulse code modulated image signal values, comprising the steps of:

intermediately storing at a receiver said regained pulse code modulated image signal values of a small number of television lines;

analyzing the image structure of a television image/television half image from said stored regained pulse code modulated image signal values in order to recognize error trails consisting of adulterated ones of said regained pulse code modulated image signal values caused by adulteration of ones of the transmitted difference pulse code modulated image signal values; and correcting the adulterated ones of the regained pulse code modulated image signal values in said image trail with respective correction values obtained from the transmitted difference pulse code modulated image signal values.

2. The method of claim 14, wherein the step of analyzing is further defined as:

constantly comparing said regained pulse code modulated image signal values within and outside of the geometric structure of an error trail.

3. The method of claim 14, wherein the step of correcting is further defined as:

replacing said adulterated regained pulse code modulated image signal values when a plurality of regained pulse code modulated image signal values adjacent a more greatly adulterated image signal values of a core zone are aprpoximately equal.

4. The method of claim 14, wherein the step of correcting is further defined as:

replacing said adulterated regained pulse code modulated image signal values when a plurality of regained pulse code modulated image signal values adjacent an error trail are unadulterated and approximately equal.

5. The method of claim 14, and further comprising:

calculating said correction values by interpolation from a plurality of regained pulse code modulated image signal values surrounding an error trail.

6. The method of claim 5, and further defined by:

calculating the respective correction values in accordance with the relationship $\Delta s_K = \frac{1}{2}a + \frac{1}{4}b + \frac{1}{4}c$, where "a" is a difference pulse code modulated image signal value preceding an adulterated difference pulse code modulated image signal value, "c" lies directly above that adulterated difference pulse code modulated image signal value, and "b" precedes the value "c".

7. The method of claim 1, wherein the step of intermediately storing and the step of analyzing are further defined as:

intermediately storing said difference pulse code modulated signal values as said regained pulse code modulated image signal values; and comparing adjacent ones of said stored difference pulse code modulated signal values to recognize said error trail.

8. The method of claim 6 and further comprising the steps of:

identifying an adulterated difference pulse code modulated value which caused said error trail; and replacing the identified adulterated difference pulse code modulated image signal value a correction value.

9. The method of claim 8, wherein zero is selected as the difference pulse code modulation correction value.

10. The method of claim 8, and further comprising the step of:

interpolating the difference pulse code modulated correction value from an adjacent one of said difference pulse code modulation values.

11. The method of claim 10, wherein the step of interpolating is further defined as:

peforming a loop calculation.

12. The method of claim 8, and further comprising the step of:

interpolating the difference pulse code modulated correction value from the adjacent pulse code modulated image signal values.

13. The method of claim 12, wherein the step of interpolating is further defined as:

performing a loop calculation.

* * * * *